United States Patent [19]

Müller

[11] Patent Number: 4,500,435
[45] Date of Patent: Feb. 19, 1985

[54] METHOD AND APPARATUS FOR CLEANING PRESSURE FILTERS

[75] Inventor: Hans Müller, Erlenbach, Switzerland

[73] Assignee: DrM, Dr. Müller AG, Maennedorf, Switzerland

[21] Appl. No.: 529,537

[22] Filed: Sep. 6, 1983

Related U.S. Application Data

[63] Continuation-in-part of Ser. No. 320,711, Nov. 12, 1981, abandoned, which is a continuation of Ser. No. 175,193, Aug. 8, 1979, abandoned.

[30] Foreign Application Priority Data

Aug. 8, 1979 [CH] Switzerland .................. 7261/79

[51] Int. Cl.³ .............................................. B01D 29/38
[52] U.S. Cl. .................................. 210/798; 210/333.01
[58] Field of Search ............... 210/333.1, 333.01, 334, 210/410, 412, 791, 797, 798; 55/292, 293

[56] References Cited

U.S. PATENT DOCUMENTS

| | | | |
|---|---|---|---|
| 1,724,436 | 8/1929 | Sweetland | 210/412 X |
| 2,035,592 | 3/1936 | Christensen | 210/333.01 |
| 3,107,217 | 10/1963 | Muller | 210/344 X |
| 3,187,896 | 6/1965 | Baker | 210/333.01 |
| 3,954,426 | 9/1976 | Brange | 55/292 |
| 4,055,500 | 10/1977 | Parker | 210/412 |
| 4,082,523 | 4/1978 | Dausch | 55/293 |

FOREIGN PATENT DOCUMENTS 369953 3/1932 United Kingdom ............... 210/410

Primary Examiner—John Adee
Attorney, Agent, or Firm—Michael J. Striker

[57] ABSTRACT

A method for cleaning pressure filters by means of a backwash cleaning gas or liquid supplied into the pressure vessel and impulsively pressed through the filter fabric of filtering elements to remove the filter cake deposited on the filter fabric during the filtering process.

5 Claims, 6 Drawing Figures

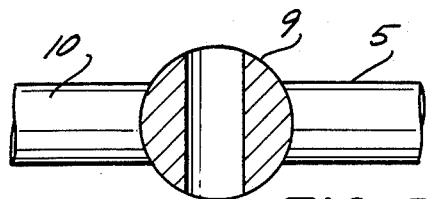
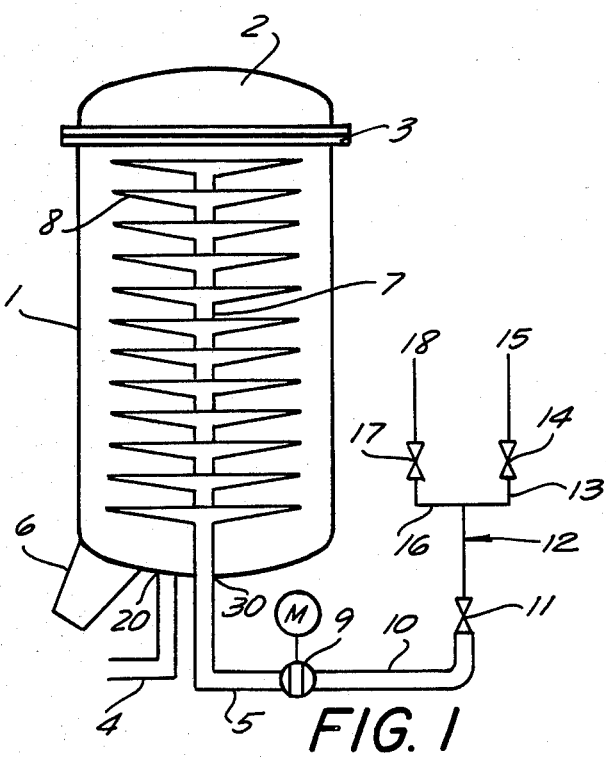
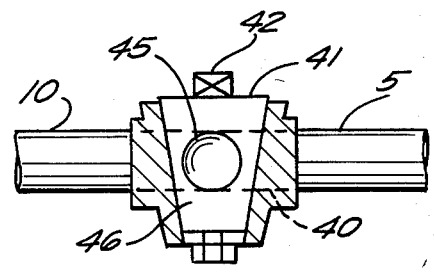
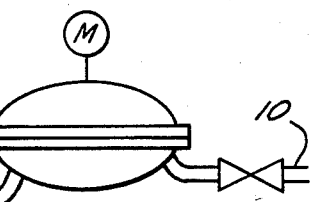
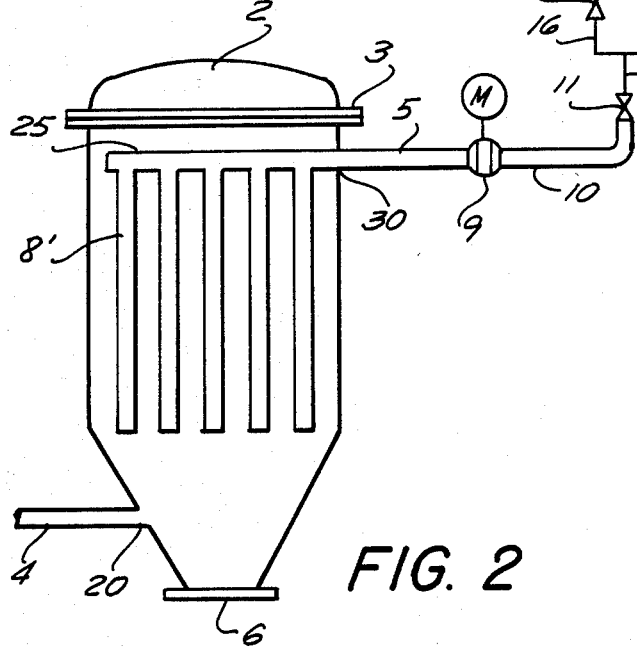
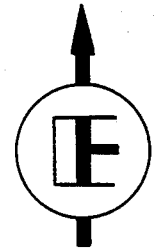

METHOD AND APPARATUS FOR CLEANING PRESSURE FILTERS

CROSS-REFERENCE TO RELATED APPLICATIONS

This is a continuation-in-part of co-pending application Ser. No. 320,711 filed on Nov. 12, 1981, now abandoned, which in turn is a continuation of abandoned application Ser. No. 175,193 filed on Aug. 8, 1979.

BACKGROUND OF THE INVENTION

The present invention relates to methods and apparatus for cleaning of pressure filter elements, and more particularly to a method for cleaning filter elements which may be utilized for alluvial filters.

Filter residues or so-called filter cakes accumulated on the surfaces of individual plates or candles constituting a filter element must be usually removed from the filter at the end of the filtration cycle.

In the prior art methods for cleaning filter elements, the filter cakes are normally removed from the filter plates by means of vibration applied to the filters. For this purpose, vibrators are mounted in the filter elements, which vibrators are used after the end of the filtration cycle. Due to vibration, filter cakes fall down from the mostly vertically positioned filter plates. The disadvantage of this method resides in that the filter elements are themselves subjected to mechanical vibrations in the area of the central shaft on which the filter plates are usually supported; these vibrations can deteriorate the cloth of the filters.

A method of cleaning alluvial filters is disclosed in the Federal Republic of Germany Pat. No. 1,761,796. In this method, the lateral sides of the filter elements are subjected to application of static pressure and after a predetermined static pressure potential has been built up oscillating pressure is applied to the filtering elements in the direction opposite to the filtration direction. The disadvantage of this method is that the filter cloth is subjected to excessive loads due to oscillating pressures acting on this cloth; these loads can cause deterioration and even cracking of the filters.

SUMMARY OF THE INVENTION

It is an object of the invention to provide an improved method of cleaning pressure filters.

Another object of the invention is to provide the cleaning of the filter elements at the end of the filtration cycle without requiring dismantling of the pressure filter.

These and other objects are attained by a method of cleaning a pressure filter having a plurality of filtering elements provided with a filter fabric through which a material to be filtered is passed in a filtration direction and which is subjected to depositing of a filter cake during the filtering process, the method comprising the step of intermittently supplying a backwash cleaning medium to said filtering elements, in the direction opposite to said filtration under repeated pulsating shock-like, rhythmic pressure impulses for pushing the cleaning medium through the filter fabric of the filter elements in said opposite direction without causing any vibrations of the latter to thereby efficiently remove the cake from each cleaning element and thus clean the filter fabric without requiring disassembling of the pressure filter.

The cleaning medium utilized in the method of the invention may be gas, or liquid or a mixture thereof.

According to another feature of the invention, the frequency of the repeated pulsating shock-like, rhythmic pressure impulses is between approximately 10–160 impulses per minute.

The objects of the invention are also attained by an apparatus for cleaning a pressure filter having a plurality of filtering elements each provided with a filter fabric through which a material to be filtered is passed in a filtration direction, a housing, an inlet for a material to be filtered, an outlet for the filtered material and conduit means for discharging the filtered material, comprising means for supplying a backwash cleaning medium to the filtering elements under repeated pulsating shock-like rhythmic pressure, the supplying means being connected to said conduit means to apply the pulsating pressure in the direction opposite to the filtration direction to remove the filter cake deposited on the filter fabric during the filtering process.

The supplying means may include a valve located in the discharging conduit means and a motor adapted to actuate the valve to provide the pulsating action on the cleaning medium.

The valve may be a ball valve. The valve also may include a housing member and an actuating member turnably movable within the housing member and having two intersecting mutually normal bores which are adapted to be successively aligned with the discharging conduit means upon the turntable movement of the actuating member.

The supplying means may include a booster pump, or a piston pump or a diaphragm pump.

The novel features which are considered characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 1 is a schematic view of a pressure filter with a plurality of horizontally located filtering elements;

FIG. 2 is a schematic view of a pressure filter with a plurality of vertical candles;

FIG. 3 is an enlarged sectional view of a ball valve mounted in an apparatus for supplying a backwash cleaning medium to the pressure filter according to the invention;

FIG. 4 is an enlarged sectional view of another embodiment of the valve;

FIG. 5 is a schematic view of a diaphragm pump which may be mounted in cleaning medium supplying apparatus according to still another embodiment of the invention; and FIG. 6 is a schematic view of a piston pump mounted in the cleaning medium supplying apparatus in accordance with one more embodiment of the invention.

DESCRIPTION OF THE PREFERRED EMBODIMENTS

Referring to the drawings, and in particular to FIGS. 1 and 2, a pressure filter comprises a housing or vessel 1 which accommodates a number of filtering elements 8 made of filter fabric or any other suitable material like e.g. polypropylene, PVDF, Polysulfon, Teflon and is covered by a cover 2 through flanges 3 provided at the end portions of the vessel and the cover respectively. The vessel 1 has a feeding conduit 4 associated with an inlet 20 of the vessel to receive a material to be filtered such as pump from a supply source (not shown). A discharging conduit 5 is provided in the pressure filter to discharge the filtered material from the vessel after filtration. An outlet 6 is formed in the vessel to remove residuals such as a filter cake which is normally formed in the filtering process.

The pressure filter illustrated in FIG. 1 is a filter of the conventional type and has a hollow central shaft 7 surrounded with a number of the filtering plates 8 forming a filter packet. The interior of the shaft 7 is connected to the discharging conduit 5.

The pressure filter shown in FIG. 2 is also of the known type and having a plurality of parallel vertical candles 8' rigidly connected to a collecting tube 25 which is in communication with the discharging conduit 5. A valve 9 is mounted in the discharging conduit, which valve connects the end portion of the conduit 5 with a pipeline or conduit portion 10. The valve 9 is driven by a motor M to provide a pulsating action on a backwash cleaning medium which is supplied to the vessel through the conduit 5 at the end of the filtration cycle. A locking valve 11 is arranged in the conduit portion 10 to open and close the line 10 when it is desired. Conduits 12, 16 and 13 connect the line 10 to cleaning medium supply sources through pressure valves 17 and 14. For example, conduits 12, 16, valve 17 and a conduit 18 may lead to a pressure liquid container (not shown) and conduits 12, 13, valve 14 and a conduit 15 may lead to a pressure gas container (not shown).

For generating pulsating movement of the cleaning medium toward the filtering elements 8 (or 8') in the direction opposite to the filtration direction, the valve 9 by means of the motor M impulsively opens and closes. At this time, the cleaning medium such as gas, or liquid, or the mixture thereof is fed under pressure through the conduit 12, valve 11, line 10 into the discharging conduit 5. The backwash cleaning medium is then passed through the filter fabric of the filtering elements 8 under repeated pulsating shock-like, rhythmic pressure thereby rinsing and simultaneously impulsively pushing the filter fabric and thus removing the filter cake from the surfaces of the filtering elements. The frequency of impulses applied to the cleaning gas or liquid is about 10–160 impulses per minute so that the filter cake is separated from the filter fabric and falls down under gravity toward the outlet 6 of the vessel from which the cake in the form of suspended solids is thereafter discharged. This impulse action is rather slow and cannot cause any vibration of the filtering elements. Obtaining a vibration thereof would be disadvantageous because the filter tissue will be outwardly expanded upon backwashing and remain in the expanded condition, so that the individual tissue fibers remain in the same condition during the cleaning step. The tissue is thus caused to vibrate in its entirety when in the expanded state. When applying a pulsating motion, the filter tissue actually follows the movement of the medium. This means that the filter tissue is caused to carry out an outward movement and then to return into the normal pressureless position. Consequently, the individual fibers of the filter tissue move relative to each other thereby enhancing the cleaning effect.

FIG. 3 shows a ball valve which is turnable by the motor M to provide the pulsating movement of the cleaning medium in the manner described above.

FIG. 4 shows a valve having a housing member 40 which accommodates an inner activating element 41 turnable within the housing member by means of a drive member 42 which may be connected to a motor (not shown). The element 41 is formed with two intersecting mutually normal bores 45 and 46 which are successively alignable with the discharging conduit 5 and line 10 to apply the pulsating movement to the cleaning medium flowing under pressure from line 10 to the conduit 5.

A diaphragm pump connected to a motor and illustrated in FIG. 5 may be utilized to produce the pulses applied to the cleaning medium. The diaphragm of the pump is vibrated by means of the motor M to provide the pulsating movement of the cleaning medium.

A piston pump schematically shown in FIG. 6 may also be used for pulsating of the cleaning medium supplied to the filter vessel at the end of the filtration cycle. A booster pump of the conventional type may also be used as supplying means for the backwash cleaning medium.

In operation, if it is necessary to discharge a dried filter cake which should be removed from the filter vessel after the end of the filtering process air or gas is utilized as a cleaning medium which is impulsively pressed through the filtering elements in the direction opposite to the filtration direction in the manner described above. The filter cake then falls to the bottom of the vessel and is thereafter removed from it.

When wet suspended solids are deposited on the filter fabric a pressure liquid is used as a backwash cleaning medium which is pressed through the filtering element in the manner described herein. In this case, the pulses may be intensified to vibration.

It will be understood that each of the elements described above, or two or more together, may also find a useful application in other types of methods and apparatus for cleaning a pressure filter differing from the types described above.

While the invention has been illustrated and described as embodied in a method and apparatus for cleaning a pressure filter, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

The following two examples are referring to different materials and respectively applied impulses with indication of the magnitude and frequency of the impulses in each example.

EXAMPLE 1

For filtration Polypropylene is used as filter element. When cleaning the filter elements, the backwash cleaning medium is pressed in direction opposite to the filtration under repeated, pulsating shock-like rhythmic pressure impulses of a magnitude ranging between 2 and 10 and in a frequency of 10 to 160 impulses per minute, at a pressure of 0.5 to 3 bar.

EXAMPLE 2

For filtration P.V.D.F. is used as filter element. In this example, the backwash cleaning medium is pressed in direction opposite to the filtration under repeated, pulsating shock-like rhythmic pressure impulses of a magnitude ranging between 2-10 and in a frequency of 10-160 impulses per minute, at a pressure of 0.5 to 3 bar.

I claim:

1. A method of cleaning a pressure filter having a plurality of filtering elements each provided with a filter fabric through which a material to be filtered is passed in a filtration direction and which is subjected to depositing of a filter cake during the filtering process, comprising the steps of intermittently supplying a backwash cleaning medium to said filtering elements, in the direction opposite to said filtration under repeated pulsating shock-like, rhythmic pressure impulses for pushing the cleaning medium through the filter fabric of the filter elements in said opposite direction without causing any vibrations of the latter to thereby efficiently remove the cake from each cleaning element and thus clean the filter fabric without requiring disassembling of the pressure filter, the cleaning medium being supplied with a frequency of approximately 10–160 impulses per minute.

2. A method as defined in claim 1, wherein said backwash cleaning medium is a gas.

3. A method as defined in claim 1, wherein said backwash cleaning medium is a liquid.

4. A method as defined in claim 1, wherein said backwash cleaning medium is a mixture of gas and a liquid.

5. A method of cleaning a pressure filter having a plurality of filtering elements each provided with a filter fabric through which a material to be filtered is passed in a filtration direction and which is subjected to depositing of a filter cake during the filtering process, comprising the steps of intermittently supplying a backwash cleaning medium to said filtering elements, in the direction opposite to said filtration under repeated pulsating shock-like, rhythmic pressure impulses for pushing the cleaning medium through the filter fabric of the filter elements in said opposite direction without causing any vibrations of the latter to thereby efficiently remove the cake from each cleaning element and thus clean the filter fabirc without requiring disassembling of the pressure filter, said impulses each having a magnitude of 2-10 at 0.5-to 3 bar.

* * * * *